United States Patent [19]

Pfeifer

[11] Patent Number: 4,772,328
[45] Date of Patent: Sep. 20, 1988

[54] HYDRAULIC CEMENTITIOUS COMPOSITIONS REINFORCED WITH FIBERS CONTAINING POLYACRYLONITRILE

[75] Inventor: Charles R. Pfeifer, Newport News, Va.

[73] Assignee: BASF Corporation, Williamsburg, Va.

[21] Appl. No.: 943,525

[22] Filed: Dec. 18, 1986

[51] Int. Cl.$^4$ .......................... B32B 5/16; C04B 7/02; C04B 24/00
[52] U.S. Cl. ........................................ 106/97; 106/90; 106/99; 106/109; 106/111; 106/116; 428/327; 428/703
[58] Field of Search .................... 106/90, 99, 97, 109, 106/111, 116; 428/327

[56] References Cited

U.S. PATENT DOCUMENTS

| | | | |
|---|---|---|---|
| 2,983,571 | 5/1961 | Stanton | 18/54 |
| 3,591,395 | 7/1971 | Zonsveld et al. | 106/99 |
| 3,645,961 | 2/1972 | Goldfein | 260/37 N |
| 4,414,031 | 11/1983 | Studinka et al. | 106/90 |
| 4,477,522 | 10/1984 | Sheehan | 428/359 |
| 4,514,947 | 5/1985 | Grail | 106/90 X |
| 4,515,636 | 5/1985 | Carney et al. | 106/90 |
| 4,565,840 | 1/1986 | Kobayashi et al. | 106/99 X |
| 4,643,362 | 2/1987 | Serafin | 106/90 X |

FOREIGN PATENT DOCUMENTS 1178012  11/1984  Canada ........................... 18/1211

OTHER PUBLICATIONS

Properties of Polyacrylonitrile Fiber Reinforced Concrete—Fall 1986, Dr.—Ing. H. Hähne, et al.
DOLANIT High Tenacity Acrylic Fibers for Industrial Applications—Fall 1986.
Fibrous Reinforcement for Portland Cement, Goldfein, S—*Modern Plastics* 42, 156 (1965).
Article entitled "Internationale Chemiefasertagung International Man-Made Fibres Congress", by Dr.—Ing. Helfried Hahne, 9-24/26-1986.

*Primary Examiner*—George F. Lesmes
*Assistant Examiner*—D. R. Zirker
*Attorney, Agent, or Firm*—Edward F. Sherer

[57] ABSTRACT

A reinforced hydraulic cementitious composition containing a fibrous material comprising a homopolymer of acrylonitrile or a copolymer of acrylonitrile having a molar concentration of acrylonitrile monomer units in the range of from about 98 percent to about 100 percent which has a denier in the range of from about 1 to about 25 and a length of from about 0.15 inch to 1 inch.

7 Claims, No Drawings

HYDRAULIC CEMENTITIOUS COMPOSITIONS REINFORCED WITH FIBERS CONTAINING POLYACRYLONITRILE

BACKGROUND OF THE INVENTION

A. Field of the Invention

The present invention relates to hydraulic cementitious compositions, including concrete, stucco, and mortar, which contain reinforcing fibers of polyacrylonitrile having a molar concentration of acrylic nitrile monomer units in the range of from about 98 percent to about 100 percent.

B. Description of the Prior Art

Hydraulic cement compositions, such as concrete products, have long been recognized as desirable for construction purposes, especially for use in structures subject to heavy loading, high external or internal pressures, etc. where the weight of the structure is not a critical factor.

A relative weakness of certain hydraulic cement compositions used as structural materials is the propensity of the matrices to crack during drying, setting, curing or when compressed. Thus, it is known to include materials within these compositions for the purpose of mitigating these problems.

The demands placed on fibers which are designed for reinforcement of cement and other hydraulically setting materials are extremely high. For instance, the physical fiber data should agree with the physical data of the cement in important characteristics. It is known that cement exhibits a certain brittleness and can break, for example, at an extension of as little as 0.3%. With respect to the use of reinforcing fibers in cement, it has been shown that fibers have the best reinforcing effect when they oppose a minimal extension of the cement with the greatest force. It must be noted in this regard, however, that the characteristics of fibers treated with an aqueous cement paste can change, and, thus, it cannot be foreseen to what degree such a change can occur. This means that despite good original mechanical values of a fiber, when it is used in the cement, it may not achieve the expected effect if its characteristics change during the hydration process of the cement.

In addition to these described physical characteristics of fibers, it is also important that the fibers be well dispersed in an aqueous cement paste and also remain uniformly distributed therein when additional additives are included within the cement. This characteristic is especially important when the fibers are utilized to form fiber-cement products by drainage methods.

Steel fiber, wire, or rods have been utilized in cement in an attempt to counteract some of these problems. The use of such material is unsatisfactory for a number of reasons. Steel has low elongation even at high tensile stresses and, therefore, is likely to slip within the matrix when the structural member is subjected to loads. In addition, due to the relative stiffness and lack of workability of steel, it is relatively heavy and therefore costly to achieve a given proportionate volume within the matrix.

The use of glass as reinforcement for cementitious materials, such as concrete, has been investigated for many years. Consideration has been given to the use of glass fiber rods to replace steel reinforcement, as well as the use of glass enforcement in the form of fibers, flakes and woven or nonwoven fabrics. Particular attention has been given to the use of glass fibers as a reinforcement for cement or concrete.

A serious problem in employing glass as a reinforcement for cement is the alkaline environment of the inorganic cementitious composition, which is highly deleterious to the glass and results in significant loss of strength in the reinforced cement or concrete products over a period of time, or even in total destruction of the glass reinforcement. Prior art approaches to overcoming the problem of alkali attack of the glass reinforcement have included the use of low alkali-type cements, the use of coatings to protect the glass from the alkali, the use of specialized alkali resistant compositions, and the use of a cation exchange material to change the inorganic alkaline binder to a form that does not attack to the glass. These approaches have not been entirely successful due to the limited availability and expense of the specialized materials required for these approaches.

The use of organic fibers admixed in cement or concrete for strengthening purposes is well known. For instance, U.S. Pat. No. 3,591,395 discloses the use of fibrous reinforcing elements formed from a stretched and then fibrillated plastics film material which is preferably a polyolefin film which has a length of at least 2 cm. and, more preferably, a length of 5 to 8 cm. A problem associated with such reinforcing elements is that fibers containing polyolefins are not particularly effective in reinforcing cementitious material and, due to the long fiber length of these fibers, large quantities of the reinforcing material are required which increases the expense of using such reinforcing fibers.

Other organic fibers have been proposed for use in reinforcing a cementitious composition. For instance, wool, cotton, silk, polyamide, polyester and polyvinyl alcohol fibers have been suggested. None of these fibers have proven entirely satisfactory as reinforcing materials in a cementitious composition.

Polyacrylonitrile fibers have been proposed, such as in U.S. Pat. No. 4,414,031, for use in reinforcing a cementitious composition. These fibers are subject to the same limitations, with respect to cement reinforcement, as the previously described fibers. It has been previously suggested that, to be effective for cement reinforcement, polyacrylonitrile fibers require a high strength (at least 5.7 g/denier), high modulus (e.g. 113 to 226 g/denier) and low extensibility (up to 15 percent).

Accordingly, a need exists for fibers in which can be effectively and economically used as reinforcements in hydraulically setting, structural materials, such a cementitious composition.

SUMMARY OF THE INVENTION

The discovery now has been made that when a fibrous material comprising polyacrylonitrile and having a denier in the range of about 1 to about 25 and length of from about 0.15 inch to about 1 inch is admixed with hydraulic cement and, optionally, selected aggregates, there is produced a cementitious composition having a compressive and flexural strength that is substantially greater than conventional nonfibrous cementitious compositions and other fibrous cementitious compositions.

It has further been suprisingly and unexpectantly discovered that, by using the aforedescribed acrylonitrile fibers of only modest strength (e.g. 4.5 g/denier), ordinary modulus (e.g. 50–60 g/denier), and high extensibility (e.g. 25–35 percent) in cementitious compositions, the compressive strength of the composition is increased in an amount substantially greater than what could be expected with conventional reinforcement of the cementitious composition even if perfect adherence of the fiber to the cementitious matrix were obtained and even if the modulus of the fiber was as high or even higher than that of the cementitious matrix.

DESCRIPTION OF THE PREFERRED EMBODIMENTS

In the present specification, the term "hydraulic cement" as used herein refers to those inorganic materials which set up to a hard monolithic mass under water. Generally, any hydraulic cement can be used in the cement composition of the present invention. Portland cement is generally preferred because of its low cost, availability, and general utility, but other cements such as pozzolan cements, gypsum cements and high alumina content cements may be used in the invention. Portland cements of ASTM Types I and II are the most preferred cements for use in the invention in most instances, although other ASTM Types of cements, such as Type N, may be utilized. The characteristics of these cements is described in the 1976 Annual Book of ASTM Standards, which is incorporated herein by reference.

The term "polyacrylonitrile," as used herein, refers to a substantially linear homopolymer of acrylonitrile or a copolymer of acrylonitrile having at least 98% by weight of acrylonitrile and up to 2% by weight of vinyl monomer which is copolymerizable with acrylonitrile such as methyl acrylate, methyl methacrylate, vinyl acetate, and vinyl derivatives containing sulfo or carboxyl groups.

Preferably, the polyacrylonitrile has a weight average molecular weight in the range of 50,000 to about 5,000,000, and, more preferably, has a weight average molecular weight in the range of from about 80,000 to 120,000.

The fibers used in accordance with the present invention have a length of from about 0.15 inch to about an inch and have a denier in the range of from about 1 to about 25. More preferably, the fibers have a length of from about 0.375 inch to about 0.75 inch and, most preferably, the fibers have a length of about 0.375 to about 0.50 inch. The fibers preferably have a denier in the range of from about 1.5 to about 21, and, more preferably, have a denier in the range of from 1.5 to 3.0.

The strength, modulus, and extensibility of the acrylonitrile fibers of the present invention will vary over a wide range, depending on the specific formulation of the cementitious composition with no limitations. Specifically, acrylonitrile fibers have a strength in the range of from about 3.0 g/denier to about 5.0 g/denier, a modulus in the range of from about 30 g/denier to about 70 g/denier and an extensibility in the range of from about 25 to about 35 percent have been found to have particular application in the present invention.

Examples of dimensions of particularly preferred fibers comprise homopolymers or copolymers of acrylonitrile having the following denier and length as set forth in Table I.

TABLE I

| Fiber | Denier | Length (Inches) |
|---|---|---|
| A | 1.5 | 0.375 |
| B | 2.7 | 0.375 |
| C | 3 | 0.375 |
| D | 21 | 0.75 |

The manufacture of the fibers, utilized in the invention can be carried out by methods known in the art.

A particularly preferred method for manufacturing the fibers is disclosed in U.S. Pat. No. 2,983,571, which is hereby incorporated by reference. The method generally comprises extruding, preferably through a multi-hole spinnerette, an aqueous zinc chloride solution containing acrylonitrile polymer into an aqueous coagulating bath containing zinc chloride. The aqueous zinc chloride solution which is extruded is made up of preferably about 55 to about 65 percent by weight zinc chloride in water in which is dissolved about 10 to about 14 percent by weight acrylonitrile polymer. More preferably, the aqueous zinc chloride solution contains about 60 percent by weight zinc chloride and about 12 percent by weight acrylonitrile polymer.

The concentration of zinc chloride in the coagulant bath is generally in the range of from about 25 to about 45 percent by weight in water and the temperature of the bath is generally maintained between about 0° C. and about 35° C. The direction of travel of the extruded filaments in the coagulation bath may be horizontal, downward or upward.

The coagulated filaments are then washed, preferably by passing the filaments through multi-stage washing zones in which water flows counter-current to the moving filaments. Next, the washed filaments are preferably passed into stretching zones which are immersed in hot water. The overall stretch ratio is preferably between 8 to 14 times, and, more preferably about 10 times.

The stretched filaments are then dried. The drying of the filaments preferably takes place between about 130° C. and 160° C. at high humidity conditions. Subsequent to the drying, the filaments are cut into the appropriate length and also, if desired, may be crimped.

The amount of fibers used in the present invention is preferably an amount in the range of from about 0.05 to about 0.5 percent by weight of the cement composition excluding water. More preferably an amount of fibers utilized is in the range of from about 0.075 to about 0.2 percent by weight of dry mix and, most preferably, about 0.1 percent by weight of dry mix containing coarse aggregate or about 0.2 percent by weight of dry mix without coarse aggregate.

The cement mix may also include conventional types of fillers including aggregates such as a coarse aggregate such as gravel and fine aggregates such as sand. The fine and coarse aggregates can be natural or manufactured. The amount of coarse and fine aggregate, when utilized, will generally be an amount in the range of from about 50% to about 1000% by weight of hydraulic cement. Generally, the coarse aggregate will have an average maximum size of up to 1½ inches and, more preferably, an average maximum size up to 1 inch. The fine aggregate which can be present in the mix with or without coarse aggregate, will generally have an average maximum size of up to ⅜ inch, and, more preferably, an average maximum size up to 3/16 inches, and will be present in the composition in an amount of from about 100 percent to about 300 percent by weight of the hydraulic cement. For instance, the mixture may constitute a mixture of hydraulic cement, sand and gravel in a conventional weight ratio of 1:2:4 with the fibers. The fillers are preferably used in amounts ranging from about 20 to about 300 percent by weight of dry hydraulic cement.

Although not necessary, when aggregates are utilized, the average length of the fiber can be less than the largest aggregate size used in the formulation and still obtain effective reinforcement.

Property modifying additives known in the cement and concrete industry as "admixtures" may also be included in the cement compositions. These are compounds or materials known to improve or alter the cement characteristics, and when used are generally incorporated in amounts of from about 0.1 percent up to about 20 percent by weight based upon the dry weight of the cement binder. Products classified as admixtures include pigments, water reducing admixtures, water retaining admixtures, air entraining admixtures, set accelerators, waterproofing admixtures, expansion producing admixtures, shrinkage compensation admixtures and plasticizers. When modifying additives are utilized, preferably they are employed within a weight ratio of cement to additive in the range of from about 1000:1 to about 4:1.

The amount of water to be admixed with the ingredients will vary in accordance with the particular cement composition. Generally, water will be added to the dry mixture in an amount in the range from about 20 to about 130 percent by weight of hydraulic cement, more preferably, from about 35 to about 60 percent by weight of hydraulic cement, and most preferably about 50 percent by weight of hydraulic cement.

The cementitious compositions of the present invention can be prepared in various ways, which are known to persons skilled in the art.

A particularly preferred procedure comprises mixing hydraulic cement, water, preferably in an amount of about 50 percent by weight of dry cement, optionally aggregates such as sand and/or gravel, and any other additives which may be utilized and then adding the fibers to the admixture preferably, but not necessarily, gradually and with constant mixing until the fibers are properly dispersed within the admixture. For example, in accordance with the present invention, 1:2:4 concrete suitable for floors, beams, columns, foundations, etc., may be made by mixing 100 pounds of dry hydraulic cement, 200 pounds of sand and 400 pounds of gravel. Approximately 50 pounds of water are then added with constant stirring until a uniform mixture has been formed having a water-cement ratio of 0.50. It is sometimes preferred to halt mixing for a period of 1 to 5 minutes after an initial blending period to allow hydration and bonding of the cement and particulates before resuming the mixing operation. The mixing is then continued while from about 0.35 pounds to about 3.5 pounds of fibers are gradually added so they are sufficiently mixed in with the concrete. The mixture may then be poured into a mold and handled in exactly the same manner as ordinary cement.

Another method of preparing the concrete comprises, mixing the cement, sand, gravel. and fibers together dry and then adding the water. The first described method is preferred because a more uniform distribution of the fibers is achieved.

It will be appreciated that it is not essential that fibers of uniform length be utilized.

In addition, the surface of the fibers can be coated to improve fiber/cement adhesion. Generally, the amount of coating material utilized is in the range of from about 0.4 percent to about 1.0 percent by weight of fiber. Suitable coating materials include fatty alkyl phosphate esters and polyoxyethylated alkyl phenols. The coating material may be used in conjunction with a lubricant such as mineral oil. A preferred coating material comprises substantially equal parts of a hydrogenated tallow phosphate ester diethanolamine salt, a polyoxyethylated alkyl phenol sold under the name IGEPAL which is available from GAF Corp., and mineral oil.

It has been found that the fibers in the cementitious admixtures of the invention are especially compatible with a high pH medium, may be readily bonded to the cement, and may be uniformly distributed therein. In addition, it has been found that although the fibers have a minimum absorption characteristic, the admixture is stiffened somewhat by the inclusion of the fibrous material. Moreover, the cementitious admixture of the invention containing the fibers provide a superior product in compressive strength, modulus of elasticity, impact strength index, and splitting tensile strength.

In general, the present invention can be applied to the manufacture of a wide variety of articles including prefabricated sheets, slabs, and panels for use in the building industry, since the improved strength thereof is an advantage not only during the use of the articles, but also when handling them during mold removal, storage, and transportation. In addition to the manufacture of precast articles for use in the building industry it is also advantageous to apply the present invention to on-site installation of concrete structures such as floor slabs, sidewalks, walls, highways, and bridges by pouring, pumping, or gunning.

The present invention is also particularly suited for one coat stucco exterior wall covering over external insulated wall construction systems. Preferably, the fiber is incorporated into a Portland Cement, sand, and lime mixture at a level of 0.2 percent by weight, and the wet fibered stucco mixture is applied to the exterior wall at a thickness of about ⅜ inch.

The composition of the present invention is furthermore particularly suitable as surface bonding cements for applying to the surface of a concrete block wall and the like for bonding the blocks together.

The composition provides a stucco appearance on the surface of the wall. When the composition is employed as a surface bonding cement, it should be mixed with water to a creamy consistency and applied by spraying or by trowel to the surface of the stacked block or brick wall, preferably about one-eighth inch thick and up to one-fourth inch thick.

The invention is further exemplified by the examples below which are presented to illustrate certain specific embodiments of the invention, but are not intended to be construed so as to be restrictive of the spirit.

EXAMPLE I

An acrylonitrile fiber suitable for use in the invention was prepared. The procedure was carried out by a dissolving a sufficient amount of acrylonitrile polymer having a average molecular weight of 97,000 in an aqueous solution containing 59.8 percent by weight of zinc chloride such that 11.7 percent by weight of acrylonitrile polymer was present in the solution. The resulting solution was spun through a multi-hole spinnerette ~ (276,000 holes) into a coagulation bath having a temperature of about 10.5° C. and comprising 44.0 weight percent of zinc chloride. The tow exit speed of the filaments from the bath was 22.5 fpm. The filaments were washed with water having a temperature of 55° C. Next, the filaments were stretched 10 times in 3 pans containing water having temperatures of 80° C., 100° C., and 100° C. The final tow speed of the filaments was 225 fpm. The filaments were dried by means of a belt drier at a temperature of 150° C. (50° C. wet bulb). The resulting filaments had an average denier of 2.7. The filaments were then cut by means of a Lummus cutter.

The fibers had the following properties which are set forth in Table II:

TABLE II

| Property | Measurement |
|---|---|
| Density, absolute | 1.18 g/cc |
| Length | 9 mm |
| Tenacity | ~4.5 g/denier |
| Elongation | ~30% |
| Modulus | ~55 g/denier |
| pH Resistance, range | 0-14 |

EXAMPLE II

A series of concrete compositions were prepared to compare the properties of the concrete compositions containing fibers comprising polyacrylonitrile with cement compositions not containing fibers comprising polyacrylonitrile.

The concrete compositions contained the following ingredients:

| Manufacturer | Ingredients | LBS/YD$^3$ |
|---|---|---|
| Lehigh | Portland Cement | 618-657 |
| None-Potable | Water | 309-328 |
| Lone Star Cement, Inc. | Fine Aggregate | 912-969 |
| Lone Star Cement, Inc. | Course Aggregate | 1803-1917 |
| Master Builder MB-VR | Entraining Agent | 6.20-6.60 |
| BASF | Acrylic Fiber | Varying Amts. |

The fine aggregate was classified by Lone Star Cement as concrete sand and had the following physical properties:

| Sieve Size | % Passing |
|---|---|
| 3/8" | 100.0 |
| No. 4 | 97.4 |
| No. 8 | 84.7 |
| No. 16 | 69.3 |
| No. 30 | 47.6 |
| No. 50 | 19.5 |
| No. 100 | 5.2 |
| No. 200 | 1.9 |
| Absorption | 1.3% |
| Bulk Specific Gravity (SSD) | 2.62 |
| Dry Rodded Unit Weight | 101.4 PCF |
| Fineness Moduus | 2.76 |

The fine aggregate conformed to grading requirements of ASTM C-33.

The coarse aggregate was a well rounded gravel and had the following physical properties:

| Sieve Size | % Passing |
|---|---|
| 3/4" | 100.0 |
| 1/2" | 78.4 |
| 3/8" | 54.7 |
| No. 4 | 7.3 |
| No. 200 | 0.5 |
| Absorption | 1.10% |
| Bulk Specific Gravity (SSD) | 2.58 |
| Dry Rodded Unit Weight | 110.7 PCF |

The coarse aggregate conformed to grading requirements for number 67 aggregate as set forth in ASTM C-33.

The tests were carried out in accordance with applicable American Society for Testing and Materials' (ASTM) Standards.

Table III lists the applicable ASTM designation for the test performed:

TABLE III

| Test | ASTM DESIGNATION |
|---|---|
| Slump of Fresh Concrete | C-143 |
| Inverted Slump | C-995 |
| Unit Weight and Air Content | C-138 |
| Compressive Strength | C-39 |
| Modulus of Elasticity | C-469 |
| Tensile Split Test | C-496 |
| Shrinkage Test | C-157 |
| Setting Time | C-403 |
| Fexural Strength | C-78 |

Impact Strength Index

The test, which demonstrates the amount of impact energy necessary to start a visible crack in the concrete and then to propagate or continue to open the crack, is described in ACI (American Concrete Inst.) publication 544, 2-R5.

Equipment

Equipment for the test comprised: (1) a standard, manually operated, 10 lb. compaction hammer with an 18 in. drop (ASTM D 1557-70); (2) a 2.5 inch diameter, hardened steel ball; and (3) a flat baseplate with positioning bracket.

Procedure

The 2.5 inch thick by 6 inch diameter concrete samples were cut from full-sized cylinders to yield a specimen size of the proper thickness. Specimens were tested at 28 days of age. Curing and handling of the specimens was similar to that used for compressive cylinders. The thickness of the specimens was recorded to the nearest 1/16 inch. The reported thickness was determined by averaging the measured thickness at the center and each edge of the specimen along any diameter across the top surface. The samples were placed on the baseplate within the positioning lugs with the finished face up. The positioning bracket was then bolted in place and the hardened steel ball was placed on top of the specimen within the bracket. The drop hammer was placed with its base upon the steel ball and held there with enough down pressure to keep it from bouncing off of the ball during the test. The baseplate was set solidly on a rigid base, such as a concrete floor, and the person performing the test stood with both feet on the baseplate. The hammer was dropped consecutively, and the number of blows required to cause the first visible crack on the top and ultimate failure was recorded. Ultimate failure is defined as the number of blows required to open the crack in the specimen sufficiently so that the pieces of concrete are touching three of the four positioning lugs on the baseplate.

The water-cement ratio of the cementitious compositions was 0.50 unless otherwise indicated.

The results of these test are set forth in Tables IV and V. The percent difference between the control sample and the sample containing the reinforcing fiber is set forth in parenthesis.

TABLE IV

TEST RESULTS OF CEMENT REINFORCED WITH HOMOPOLYMER POLYACRYLONITRILE (PAN) FIBERS

| Mix. No. | FIBER DIMENSIONS Denier | Length (in.) | FIBER USED (% by Weight of Total Mix) | AIR CONTENT (% by Volume) | UNIT WT. Lbs./Cu. Ft. | SLUMP (in.) | INVERTED SLUMP (sec.) |
|---|---|---|---|---|---|---|---|
| Control | — | — | — | 8.0 | 137.8 | 6.75 | 5 |
| A | 2.7 | 3/4 | 0.1 | 6.1 | 141.2 | 2.75 | 11 |
| B | 2.7 | 3/4 | 0.1** | 9.0 | 134.2 | 4.25 | 5 |
| C | 2.7 | 3/4 | 0.1*** | 6.8 | 137.0 | 3.25 | 6 |
| D | 1.5 | 3/4 | 0.075 | 6.5 | 136.8 | 3.00 | 6 |
| E | 1.5 | 3/16 | 0.075 | 7.2 | 135.4 | 4.75 | 5 |
| F | 2.7 | 3/4 | 0.075 | 6.5 | 137.6 | 8.00 | 2 |
| G | 2.7 | 3/4 | 0.050 | 7.0 | 135.0 | 6.00 | 5 |
| H | 40 | 3/4 | 0.050* | 9.5 | 132.2 | 7.00 | 4 |
| I | 40 | 3/4 | 0.100* | 8.5 | 135.0 | 5.00 | 6 |

| Mix. No. | COMPRESSIVE STRENGTH (PSI) | SPLITTING TENSILE STRENGTH (PSI) | MODULUS OF ELASTICITY (PSI × 10^6) | FLEXURAL STRENGTH (PSI) |
|---|---|---|---|---|
| Control | 3867 | 393 | 3.10 | 575 |
| A | 4633 (+20) | 427 (+9) | 3.33 (+7) | 587 (+2) |
| B | 4179 (+8) | 433 (+10) | 3.33 (+7) | 574 (0) |
| C | 4456 (+15) | 390 (−1) | 3.29 (+6) | 621 (+8) |
| D | 4745 (+23) | 439 (+12) | 3.32 (+7) | 620 (+8) |
| E | 4161 (+8) | 412 (+5) | 3.33 (+7) | 564 (−2) |
| F | 4427 (+14) | 472 (+20) | 3.58 (+15) | 625 (+9) |
| G | 4250 (+10) | 432 (+10) | 3.33 (+7) | 633 (+10) |
| H | 3614 (−7) | 410 (+4) | 2.95 (−5) | 540 (−6) |
| I | 3743 (−3) | 431 (+10) | 3.11 (0) | 593 (+3) |

*Fiber comprised polyethylene
**Pozzolith N-400 superplasticizer was included in mixture in an amount of 0.3% by weight of cement
***The weight ratio of water to cement was .53.

TABLE V

TEST RESULTS OF CEMENT REINFORCED WITH HOMOPOLYMER POLYACRYLONITRILE (PAN) FIBERS

| Mix No. | FIBER DIMENSIONS Denier | Length (in.) | FIBERS USED (% by weight of dry solids) | INITIAL SET TIME (min.) | FINAL SET TIME (min.) | SLUMP (in.) | INVERTED SLUMP (sec.) |
|---|---|---|---|---|---|---|---|
| Control | — | — | — | 350 | 485 | 6.25 | 11 |
| A | 3 | 3/4 | 0.11 | 280 | 375 | 0.5 | 20 |
| B | 21 | 3/4 | 0.055 | 310 | 435 | 5.25 | 5 |
| C | 21 | 3/4 | 0.11 | 295 | 385 | 3.0 | 8 |
| D | 21 | 3/4 | 0.22 | — | — | 1.0 | 15 |
| E | 21 | 3/4 | 0.11* | 350 | 460 | 2.75 | 8 |

| Mix No. | COMPRESSIVE STRENGTH (PSI) | SPLITTING TENSILE STRENGTH (PSI) | MODULUS OF ELASTICITY (PSI × 10^6) | TENSILE STRENGTH INDEX (No. of Blows to First Crack to Failure) |
|---|---|---|---|---|
| Control | 3861 | 406 | 3.12 | 3.5/5 |
| A | 6054 (+57) | 558 (+37) | 4.03 (+29) | 15/18 |
| B | 4043 (+4.7) | 389 (−4) | 3.36 (+7.7) | 6/7.3 |
| C | 4497 (+16) | 444 (+9.3) | 3.59 (+15) | 10/11.5 |
| D | 5074 (+31) | 495 (+22) | 3.75 (+20) | 9/13 |
| E | 4634 (+20) | 482 (+19) | 3.68 (+18) | 58/60 |

Fiber coated with a lubricant in an amount of 0.65 percent by weight of fiber.

These tests demonstrate the effectiveness of the fibers of the present invention in increasing the strength of hydraulic cement.

A series of tests were carried out to evaluate the use of the fiber material in a Portland cement-based stucco composition for flexural strength. The composition had the ingredients:

| Ingredients | Amount, Parts by Weight |
|---|---|
| Portland Cement-Type II | 100 |
| Lime | 20 |
| Sand | 300 |
| Vinyl Acetate/Ethylene Copolymer | 10 |

The copolymer was present to control the rate of hydration and is available from Air Products, Inc. under the name Airflex RP-245.

Varying amounts, lengths, and denier of a fiber material comprising a homopolymer of polyacrylonitrile were utilized. The control test contained no fibers. The composition was evaluated for flexural strength using the same procedure as Example II, except that beams of 1 inch by 1 inch cross section were used. The flexural strength values reported are the modulus of rupture as per ASTM C-78. Each value reported is the average of at least three breaks. The results of these tests are set forth in Table VI.

TABLE VI

| Test No. | Fiber (amt. % by weight of dry ingredients) | (length) | (Denier) | Flex Strength (PSI) | Improvement Over Control (%) |
|---|---|---|---|---|---|
| Control | — | — | — | 821 | — |
| 1. | 0.25 | 3/8 | 21 | 815 | 0 |
| 2. | 0.31 | 3/8 | 21 | 942 | 15 |
| 3. | 0.31 | 3/8 | 21 | 956 | 16 |
| 4. | 0.50 | 3/8 | 21 | 1086 | 32 |
| 5. | 1.00 | 3/8 | 21 | 984 | 20 |
| 6. | 0.25 | 3/4 | 21 | 1068 | 30 |
| 7. | 0.50 | 3/4 | 21 | 913 | 11 |
| 8. | 1.00 | 3/4 | 21 | 954 | 16 |
| 9. | 0.30 | 3/8 | 2.7 | 1210 | 47 |
| 10. | 0.30 | 1/4 | 2.7 | 1133 | 38 |
| 11. | 0.30 | 3/8 | 2.3 | 1219 | 48 |
| 12. | 0.30 | 1/4 | 2.3 | 1104 | 34 |

The results of these tests demonstrate the effectiveness of the fiber material in increasing the flexural strength of stucco materials.

Although certain preferred embodiments of the invention have been herein described for illustrative purposes, it will be appreciated that various modifications and innovations of the procedures recited may be effected without departure from the basic principles which underlie the invention. Changes of this type are therefore deemed to lie within the spirit and scope of the invention except as may be necessarily limited to the amended claims of reasonable equivalents thereof.

What is claimed is:

1. A solid, reinforced cementitious composition comprising:
    (a) a hydraulic cement; and,
    (b) a polymerized acrylonitrile fiber material present in an amount in the range of from about 0.05 to about 0.5 percent by weight of cementitious composition and comprising a molar concentration of from about 98 percent to about 100 percent acrylonitrile monomer units and being characterized by:
        (i) having a length in the range of from about 0.375 to about 0.75 inch;
        (ii) having a denier in the range of from 1.5 to about 21; and
        (iii) having a modulus in the range of from about 30 g/denier to about 70 g/denier, a strength in the range of from about 3.0 g/denier to about 5.0 g/denier, and an extensibility in the range of from about 25 to about 35 percent.

2. The composition recited in claim 1 wherein said hydraulic cement is Portland cement.

3. The composition recited in claim 1 wherein said composition further comprises a fine aggregate and a coarse aggregate present in an amount in the range of from about 50 percent to about 1000 percent by weight of said hydraulic cement.

4. The composition recited in claim 3 wherein said fine aggregate is sand and said coarse aggregate is gravel and said fine aggregate is present in an amount in the range of from about 100 percent to about 300 percent by weight of said hydraulic cement.

5. The composition recited in claim 4 wherein said fiber material has a length of about 0.375 inch and a denier of about 1.5, a length of about 0.375 inch and a denier of about 2.7, a length of about 0.375 inch and a denier of about 3, or a denier of about 21 and a length of about 0.75 inch.

6. The composition recited in claim 1 wherein the surface of said fiber material is coated with from about 0.45 percent to about 1.0 percent by weight of the fiber with a material containing substantially equal parts of the following:
    (a) mineral oil;
    (b) a fatty alkyl phosphate ester; and,
    (c) a polyoxyethylated alkyl phenol.

7. The composition recited in claim 6 wherein said fiber is produced by the steps of:
    (a) extruding an aqueous zinc chloride solution containing acrylonitrile polymer into an aqueous coagulating bath comprising zinc chloride to form filaments;
    (b) washing the filaments;
    (c) stretching the filaments;
    (d) drying the filaments; and,
    (e) cutting the filaments.

* * * * *